Sept. 15, 1953
J. LUM
2,652,236
MANIPULATIVE MIXER
Filed July 11, 1952
Fig. 1.
Fig. 2.
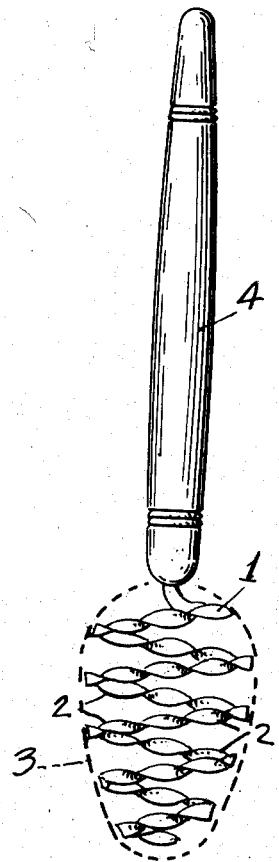
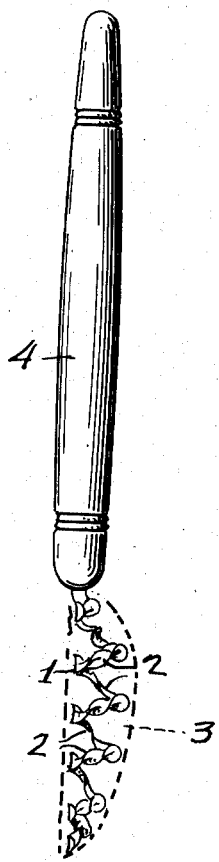
INVENTOR
JAMES LUM
BY Arthur L. Slee
HIS ATTORNEY.

Patented Sept. 15, 1953

2,652,236

UNITED STATES PATENT OFFICE 2,652,236

MANIPULATIVE MIXER

James Lum, San Francisco, Calif.

Application July 11, 1952, Serial No. 298,370

2 Claims. (Cl. 259—144)

The present invention relates to a new and improved article of manufacture comprising a mixer, wherein a strand or ribbon, preferably spiraled longitudinally, is zigzagged, or bent into a series of short alternating arcuate turns or angles from side to side, to form an open-work mixing spoon, said ribbon having a suitable handle whereby the mixer conveniently and efficiently may be manipulated within a concoction and agitated to force the ingredients thereof through said open-work spoon where a multiplicity of variously inclined areas of the alternating arcuate turns of said spiral ribbon will operate to more quickly and thoroughly mix said ingredients with a minimum of time and expended energy.

The primary object of the present invention contemplates a new and improved article of manufacture comprising a mixer having improved means adapted to thoroughly agitate and blend or mix together several ingredients of a mixture to form a thoroughly homogeneous concoction.

Another object is to provide a new and improved device of the character set forth having improved means adapted to force the several ingredients of a concoction into an even or uniform texture, such as a mayonnaise, or the like.

A further object is to provide a new and improved device of the type described having a greatly simplified and economically produced and conveniently operated construction and a maximum efficiency.

The improvement comprises the mixer disclosed in the drawings forming a part of the present application, and in which—

Figure 1 is a front elevation of my improved mixer; and

Figure 2 is a side elevation thereof.

The numeral 1 is used to designate in general a strand or ribbon, of thin metal, plastic, or other suitable material, preferably spiraled longitudinally, and zigzagged or bent into a series of short, alternate and arcuate turns or angles 2, and forming in contour preferably an open-work spoon-bowl 3, as indicated by the broken outlines in the drawings. A suitable handle 4 may be attached or formed upon one end of said strand or ribbon 1 to facilitate manipulation of the mixer or open-work spoon-bowl.

In operation, the bowl 3 is placed within a mixture of ingredients, not shown, to be mixed into a required concoction, such, for instance, as a mayonnaise or the like. By agitating the bowl 3, by means of the handle 4, said ingredients are forced against the series of variously inclined areas formed by the arcuate spiraled turns 2 and thence through the openings between said arcuate turns, whereby a thoroughly blended and homogeneous concoction is obtained.

It is obvious, from the foregoing, that the novel structure thus presented, has improved means adapted to thoroughly mix or blend liquid or semi-liquid ingredients into a uniform texture.

Also, the mixer may be used as a strainer spoon to remove virtually solid portions from a liquid, such as noodles from soup, or a similar mixture of liquids and semi-solids.

Having described my invention, I claim:

1. A mixer comprising the combination with a handle of a spiral ribbon having one end mounted upon and supported only by one end of said handle and zigzagged in alternate arcuate turns and forming an open-work mixing element.

2. A mixer comprising a handle; and a spiral ribbon having one end connected to and supported only by said handle with the body of said ribbon zigzagged away from said handle and forming an open-work mixing spoon.

JAMES LUM.

References Cited in the file of this patent

UNITED STATES PATENTS

| Number | Name | Date |
|---|---|---|
| 581,493 | Saltsman | Apr. 27, 1897 |
| 1,134,170 | Washburn | Apr. 6, 1915 |